United States Patent [19]
Koptis

[11] Patent Number: 6,007,264
[45] Date of Patent: Dec. 28, 1999

[54] INTEGRAL PACKAGE APPLICATOR

[75] Inventor: Kurtis James Koptis, County of San Bernadino, Calif.

[73] Assignee: Felix Investments, LLC, San Diego, Calif.

[21] Appl. No.: 09/204,991

[22] Filed: Dec. 2, 1998

[51] Int. Cl.[6] .................................................. B03C 17/005
[52] U.S. Cl. ...................... 401/132; 15/104.93; 206/210; 206/219; 206/222; 206/229; 401/133; 401/196; 604/3; 604/306; 604/310
[58] Field of Search .................................. 401/132–135, 401/196; 604/3, 2, 416, 306, 310; 206/210, 219, 222, 229, 440, 469; 15/104.93, 104.94

[56] References Cited

U.S. PATENT DOCUMENTS

| | | | |
|---|---|---|---|
| D. 351,338 | 10/1994 | Koptis | D9/302 |
| D. 363,377 | 10/1995 | Koptis | D4/122 |
| D. 386,854 | 11/1997 | Koptis | D4/114 |
| D. 387,563 | 12/1997 | Koptis | D4/114 |
| D. 398,235 | 9/1998 | Koptis | D9/435 |
| 3,429,429 | 2/1969 | Poitras | 206/222 |
| 3,647,305 | 3/1972 | Baker et al. | 401/132 X |
| 4,430,013 | 2/1984 | Kaufman | 401/132 |
| 4,629,080 | 12/1986 | Carveth | 206/219 X |
| 4,648,506 | 3/1987 | Campbell | 206/216 |
| 4,696,393 | 9/1987 | Laipply | 206/210 |
| 4,805,767 | 2/1989 | Newman | 206/219 |
| 4,896,768 | 1/1990 | Anderson | 206/210 |
| 4,921,137 | 5/1990 | Heijenga | 222/107 |
| 5,287,961 | 2/1994 | Herran | 206/219 |
| 5,487,932 | 1/1996 | Dunshee | 206/210 X |
| 5,558,874 | 9/1996 | Haber et al. | 401/132 X |
| 5,577,851 | 11/1996 | Koptis | 401/202 |

FOREIGN PATENT DOCUMENTS

| | | | |
|---|---|---|---|
| 2506140 | 11/1982 | France | 401/132 |

*Primary Examiner*—Henry J. Recla
*Assistant Examiner*—Kathleen J. Prunner
*Attorney, Agent, or Firm*—Ronald M. Goldman

[57] ABSTRACT

A small sized shallow pouch like container (3) for a dispensible ingredient includes a pair of built-in outwardly pivotable flaps (5 & 7) positioned on opposite sides of the container's outlet end to form a package applicator (1). Squeezing the container's sides with the fingers expresses the stored ingredient through the outlet and onto the applicator flaps. Using the container portion as a finger grip, the flaps may be moved about the desired surface, spreading the dispensed ingredient. In some embodiments the outlet is opened by squeezing the container sides to break a closure seal (19). In others the outlet is unsealed by pulling the flaps apart (19'); by tearing (35) or is unblocked (57) by unfolding the flaps. In a preferred embodiment the container and applicator combination is formed by a pair of flexible foil sheets of substantially identical structure (21 & 23) that are superimposed over one another and partially connected together to define both the container and the applicator.

48 Claims, 3 Drawing Sheets

6,007,264

1

INTEGRAL PACKAGE APPLICATOR

FIELD OF THE INVENTION

This invention relates to hand held dispensing applicators and, more particularly, to flexible packaging for storing and spreading a small measured quantity of an ingredient, such as, by way of example, food condiments, pharmaceutical antiseptics, salves, ointments and creams, cosmetic face creams, and technical products like polishes, waxes, adhesives and paints, upon various to surfaces by hand.

BACKGROUND

Small measured amounts of food condiments and toppings, such as ketchup, mayonnaise and mustard, are often distributed nowadays in small sized relatively flat flexible containers or packages formed of plastic coated or foil laminated foil films, whereby the user tears open the package and squeezes the package to dispense the condiment onto a sandwich or other food product. After use, the opened package is conveniently discarded in a waste basket, together with any remnant of the packaged ingredient. Another widely known product available in such flat packs is the familiar "Handi-Wipe" towellete. That flexible foil package contains a folded paper towel that is moistened with a hand cleaning fluid. The user tears open the foil, removes and unfolds the towelete, and towels the hands to clean them up after the meal. Many other examples of such miniaturized packages undoubtedly come to mind. The micro-sized packages offer convenience in storage, breakage, better sanitation and lower spillage and waste.

One specific example of the foregoing brought to applicant's attention is found in the patent literature. U.S. Pat. No. 4,921,137 granted May 1, 1990 to Heijenga entitled Dispensing Container for a Liquid or Paste-Like Substance, which describes one such container and references many earlier patents describing different constructions. Heijenga's container is a relatively flat pack whose side walls include a pre-formed flexible blister defining the storage region for the dispensable ingredient and a pre-form outlet tube, all presented in a relatively flat package with a tear off strip for the user to open the outlet tube. Compressing the blisters thereafter with one's fingers expresses the ingredient from the outlet tube.

The basic element to the foregoing micro-sized packages comprises a pair of flexible foil sheets that are superimposed over one another and thermally sealed together about the edges to define a liquid tight internal cavity. Such micro-size flat packages and the details of their construction and manufacture are well known to those skilled in the packaging art.

A common theme recognized to the foregoing packages is that they are intended to dispense the confined ingredients, not spread them out over a surface once dispensed. Reader's who've had their fingers wetted with mustard as they've sought to spread mustard dispensed from such a package upon a sandwich, inappropriately using the spent package to spread the mustard instead of reaching for a knife, should well recognize the untidy consequence.

However, as is found in other fields of endeavor that use much larger sized containers, integrating the functions of a container and an applicator into a single unit, a dispensing applicator, is beneficial. The combination offers the convenience of both a container for storing a spreadable ingredient, such as wallpaper adhesive, and a hand-held applicator, with which the dispensed adhesive may be applied to a surface, integrated within a single unit. The wall paper adhesive may be thus placed on display in the store for sale, and the purchaser may apply the adhesive with the built-in applicator, avoiding hand contamination. Dispensing applicators of the foregoing type are of a large size, typically holding six ounces or more of ingredients.

Applicant's prior invention marketed by Roman Adhesives, Inc. as the Border-Ease application, shown in U.S. Pat. No. D-351,338, granted Oct. 11, 1994, and U.S. Pat. No. 5,577,851, granted Nov. 20, 1996, is one example. That container applicator combination employs a sponge type roller applicator mounted to the end of a cylindrical container. Once the cover is opened to allow adhesive to exit the container, the applicator is reinstalled on the end of the container over that opening. By gripping the container in one's hand and squeezing its sides, the adhesive is expressed from the container's outlet into the sponge applicator. The hand held container portion now serves as the applicator handle and allows the user to roll the sponge applicator over a surface, spreading the adhesive thereover. The user is able to apply adhesive to small areas, without ever needing to touch the adhesive or being required to clean any brushes.

Another example is applicant's prior spackling compound dispenser applicator marketed by Painter's Products Inc as "Painter's Nail Hole Filler", shown in U.S. Pat. No. D-363,377 granted Oct. 24, 1995. In this an absorbent sponge pad is installed at the end of a cylindrical plastic tube containing spackling compound. With the pad removed, the spackling compound is expressed onto the wall. The pad is reinstalled onto the tube, which now serves as a handle for the pad, and the pad is used to smooth the applied spackling. Further examples of such combination are found in applicant's patents U.S. Pat. Nos. D-386,354, D-387,563 and D-398,235.

As made known to applicant, the foregoing disability in or functional limitation to micro-sized packaging was earlier impliedly observed by another also concerned with spreadable ingredients dispensed from such a package, particularly butter, which is found in U.S. Pat. No. 4,648,506 granted Mar. 10, 1987 to Campbell, entitled Package with Spreader for Spreadable Material. The Campbell patent describes a package that is constructed with walls of different physical characteristic, one of which is flexible and the other of which is stiff, and serves as a spreader. By squeezing, the user expresses the butter onto the spreader and the user then spreads the butter about a slice of bread, as example, using that spreader.

Although interesting, it is evident that the Campbell structure in its essentials is more expensive than packaging used for like spreadable food ingredients. Due to the stiffness of the spreader portion, the spreader would appear to be limited in application; less useful with spreadable ingredients other than butter on surfaces that are not flat, but undulate, or on surfaces that could possibly be scratched by the stiff edge of the spreader. Further the Campbell structure only contains a single spreading surface Since the spreader extends in essentially the same axial direction as the package, it appears suitable for spreading ingredient upon a small surface that can be lifted in one hand, such as the slice of bread, while the other hand is used to move the spreader. It doesn't appear suitable in different application, for example, to spread paint over a wall, which is large in area and cannot be lifted up in one's hand. While seemingly spreading paint with this spreader on one portion of the wall, albeit poorly, the users hand palm would likely rub against another portion of the wall. For whatever reason, the Campbell structure is not found in any grocery store frequented by applicant and may thus not have achieved success in the marketplace.

As one advantage the present invention combines the functions of both container and spreader within a small sized flexible package in variety of embodiments that do not encounter one or more of the foregoing difficulties and can be adapted to a wide variety of different applications.

Accordingly, an object of my invention is to provide a new micro-sized package, capable of carrying a unit dose of ingredient, that contains a built-in applicator.

Another object of my invention is to provide a unitary package applicator combination that is inexpensive to manufacture and easy to use.

A further object of my invention is to provide a basic container applicator combination that can be used for a wide variety of spreadable products of varying viscosity intended for application to a variety of surfaces, flat, uneven and undulating in a variety of environments.

Still another object of my invention is to provide a container applicator combination that is able to spread the confined ingredients on fragile surfaces without scratching or marring such surfaces.

And a still additional object is to provide a small sized package and integral applicator combination that may be carried in ones pocket.

SUMMARY OF THE INVENTION

In accordance with the foregoing objects and advantages, a novel container and applicator combination is formed as an integral assembly that contains an internal region for confining a spreadable substance, the container, and a pair of spreadable wings for spreading said substance, the applicator.

In accordance with the invention the combination may be formed with a pair of flexible foil sheets of substantially identical structure that are superimposed over one another and partially connected together to define there between both an internal region for confining a spreadable substance and an applicator for spreading that substance upon a surface. By pressing the sides of the internal region, the confined fluid ingredients are expressed onto the applicator and/or onto the desired surface. Then, using the container portion as a finger grip, the applicator is moved by hand about the surface to spread the dispensed ingredient over the intended surface. The bond between the foil sheets is strong enough to prevent the sheets from separated by pulling apart the flaps with excessive force; and the spreadable ingredient can be expressed only through a desired outlet.

In accordance with a specific aspect to the invention, the foil sheets are joined together with thermal seams by thermo-sealing as in the prior art packages to define one or more compartments, depending upon the particular application. Confronting end portions of those sheets located at the outlet to a compartment provide wings or flaps that function as the applicator.

In one embodiment the applicator is formed of the ends of the flexible foil sheets, which, left free to pivot, form confronting flaps that may swing outwardly in opposite directions, with the outlet to the container portion located there between. And in alternative embodiments, as an additional feature, the applicator portion of the sheets includes a clothlike absorbent pad. The pad provides a soft polishing surface instead of the foil surface and/or provides a sponge like action to suck up expressed liquid and apply it to the surface. The invention encompasses a variety of novel means employed to open the dispensing outlet in various embodiments, including squeezing the packages sides, pulling the applicator flaps, tearing, or simply by unfolding the applicator from a stored position.

The foregoing and additional objects and advantages of the invention together with the structure characteristic thereof, which was only briefly summarized in the foregoing passages, becomes more apparent to those skilled in the art upon reading the detailed description of the preferred embodiments, which follows in this specification, taken together with the illustrations thereof presented in the accompanying drawings.

BRIEF DESCRIPTION OF THE DRAWINGS

In the drawings:

FIGS. 17 and 18 illustrate embodiments of circular and diamond shape;

DESCRIPTION OF THE PREFERRED EMBODIMENTS

Figures 1, 2, 3, 4, 5, 6, 7, 8, 8A, 9:
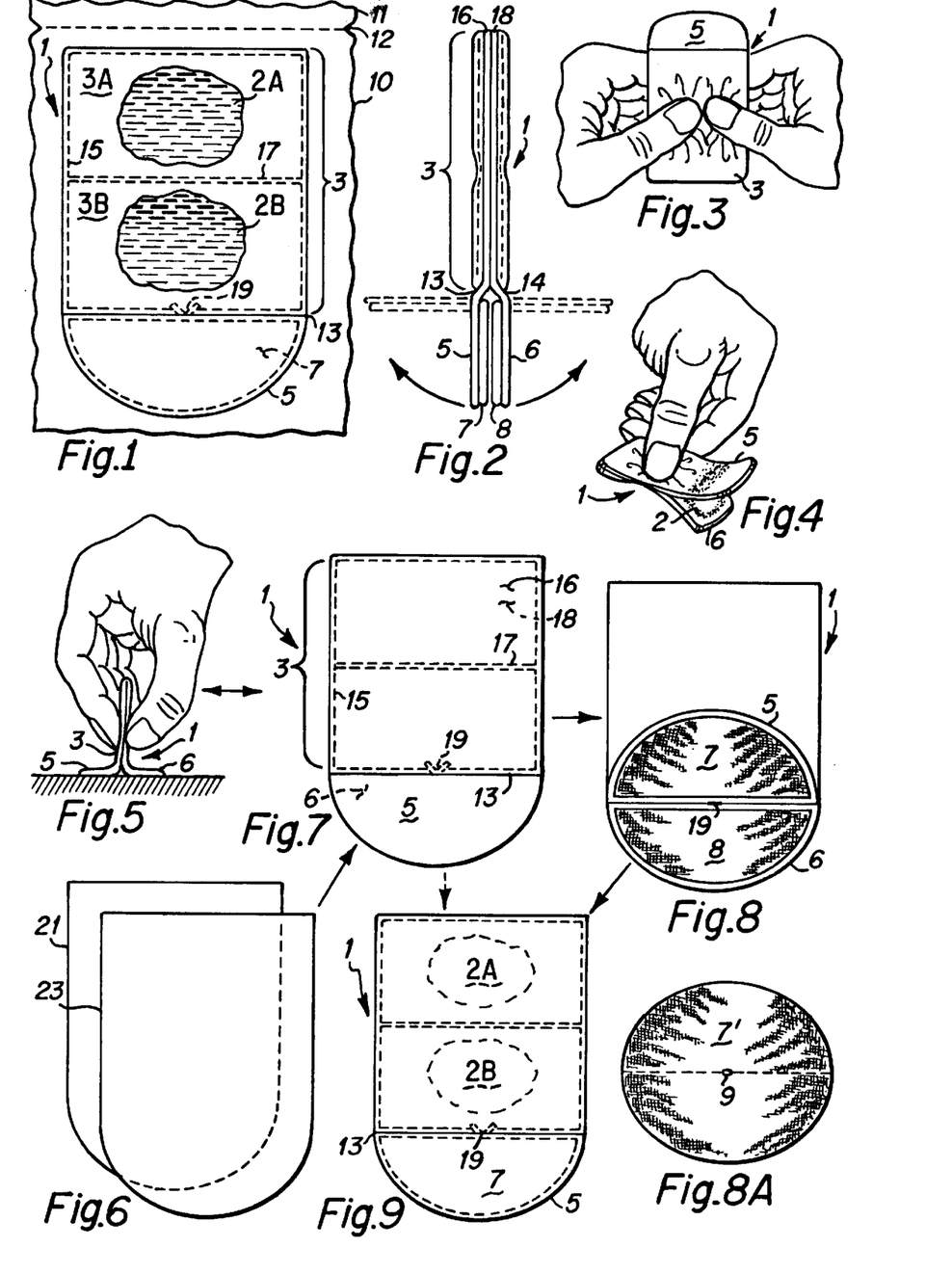
FIG. 1 illustrates a preferred embodiment of the invention.
FIG. 2 illustrates the embodiment of FIG. 1 in side view.
FIGS. 3, 4 and 5 illustrate the techniques for operation of the embodiment of FIG. 1 and also the other embodiments presented herein.
FIGS. 6, 7, 8 and 9 partially illustrates steps in a preferred procedure of fabricating the embodiment of FIG. 1.
FIG. 8a illustrates a substitute component for a component illustrated in the step of FIG. 8.

As is apparent from a brief inspection of the various drawing figures, the invention is adapted to numerous embodiments that vary in construction, structure and features. Beginning this description with one of the more complex embodiments, reference is first made to FIG. 1 illustrating a preferred embodiment of the new package-applicator 1 in top view and is in-turn packaged in a sealed wrap. As illustrated the package-applicator contains a container section 3, represented in this embodiment by the generally rectangular portion. That container section is in turn divided into two separate compartments 3A and 3B, illustrated as being filled with ingredients 2A and 2B, respectively. A wing or flap 5 is integrally formed at the narrow end of the container section 3. The flap is semicircular in shape and contains no shape corners as might catch on a surface. And, preferably, a fold line 13 is included between the flap and the container section.

A thin absorbent layer or, as variously termed, pad 7, outlined in dash lines, is attached to the underside surface of flap 5. The pad may be a soft cotton material of the kind employed in "Band Aid" brand adhesive bandages, which is both absorbent and soft, or it may be constructed of felt or like material.

The opposite or rear side of the applicator pack is a mirror image of the top side, substantially identical in structure, except that the corresponding pad is located on the upper surface of the flap. Referring to FIG. 2, illustrating container-applicator 1 in a not-to-scale side view, it is seen that the container-applicator construction is substantially symmetrical through the center. As better illustrated in this view, container section 3 is formed between a front and rear wall panels 16 and 18, joined together along the edges. As may not be evident from FIG. 2, unfilled, the package would appear flat in side view. However, because the package is illustrated as filled with ingredients 2A and 2B, consistent with FIG. 1, the package expands in thickness. Due to the confined spreadable material, the package front and rear panels, the sides, bulge out sideways.

Also one should note that the container-applicator is relatively thin, its thickness being quite small relative to its length and width. That small thickness provides essentially a relatively flat geometry to the package. Such a geometry permits large quantities of container-applicators to be stacked and packaged in a box in quantities of a few dozen for display on store shelves and sale to wholesale and/or retail customers.

As shown in the figure, a second flap 6 is located underlying flap 5. A fold line 14 is located between the flap 6 and the container section. The second flap also includes an absorbent pad 8 of like construction to pad 7, which pad 8 confronts.

Container section 3 and the flaps 5 and 6 in this embodiment are suitably formed from two webs or, as variously termed, sheets of flexible packaging foil material that are heat sealed together, as hereinafter described in greater detail. Flaps 5 and 6 are formed of an end portion of such sheets that have not been thermo-sealed together, since they are disconnected in use so they may spread apart during use, as represented by the phantom lines in the figure. As later herein described, in other embodiments the flaps may be temporarily joined by a tear-off strip to prevent the flaps from spreading apart prior to use, maintaining a relatively flat geometry for convenient packing of multiple units in a larger box.

Returning to FIG. 1, the two sheets or panels of packaging material are bonded together by heat sealing the thermoplastic material along the outer edge or periphery of the container portion to form a relatively shallow pouch. The heat sealing produces a seal or, what is referred to by applicant as, a thermal seam, represented by dash line 15. A compartment divider seal 17, illustrated by double dash lines, extends across opposite portions of thermal seam 15, dividing the container section 3 into separate compartments, and an outlet seal 19 to close the compartment's outlet are also thermally formed.

Thermal seam 15 is quite strong. It is liquid tight and resists cracking or breaking even under extreme pressures. It cannot be broken in ordinary use even if pressed by hand against a hard surface. It cannot be broken even by pulling flaps 5 and 6 apart with excessive force. Persons who have used flat packages for dispensing mustard and other condiments should be familiar with the strength of the bond. The foregoing thermal seam extends almost entirely around the periphery of the compartment portion 3, leaving a small passage or opening at the center of the lower end in the figure. The passage is the outlet to the container. The width of that outlet passage is less than the width of the container section 3, typically a fraction of the container's width, such as no greater than one-half that width, although the exact width chosen for any practical embodiment may depend on the physical characteristics of the spreadable ingredient. As example, alcohol, having low viscosity, requires only a tiny hole, while the condiment mustard, being of greater viscosity, requires a relatively larger one.

The small passage in thermal seam 15 is closed by exit seal 19, a conventional frangible seal that appears in the shape of a chevron. Unlike thermal seam 15, which is almost impossible to break by hand, this chevron seal is easily broken. The inter-compartment seal 17 is not quite so strong as the exit seal 19, as it is necessary to break this seal first in order to allow mixing of the two ingredients before dispensing the mixture.

Pads 7 and 8 are preferably included for those applications in which the container applicator combination is intended to hold a liquid, such as alcohol, that is very low in viscosity and flows freely. In such an application, the container outlet should be very small in diameter, almost a pin-hole, allowing the liquid to be squirted out somewhat, instead of freely running off. When the container is opened, the alcohol expressed from the container region will be at least be partially absorbed by the pad; and the alcohol is spread from the pad by rubbing the spread applicator pads against ones skin. This allows the package applicator to serve as an antiseptic wipe.

The soft pads are also included in applications for holding an auto polish, where a portion of the auto's body surface is to be treated and polished without scratching the body paint; and also may be included where the packaged contains are an adhesive. As later herein described, in other embodiments, the absorbent pad is omitted and the spreadable flaps alone serve to provide the applicator function.

Reference is again made to FIG. 1. To ensure sterility and/or as an additional safeguard against unintended or accidental leakage and/or to preclude the flaps from spreading apart prior to use, as an additional feature the foregoing container applicator 1 is sealed within a plastic or Cellophane wrapper 10, which forms a shallow relatively flat bag. The wrapper includes a tear-off strip end 11, formed by spaced cuts there through along dash line 12. Apart from its use in the described combination, plastic wrappers of the foregoing type and the use thereof in automatic packaging machinery are well known in the packaging art and need not be described further. When ready to use the packaged ingredients, the tear strip is removed and the container applicator is withdrawn from the wrapper.

The principal body of the package applicator is formed of familiar packaging flexible metal foil material, typically a laminate of metal foil and plastic, as later herein discussed in greater detail. The container applicator walls are thin and flexible and may be easily temporarily deformed when filled with fluid by squeezing the sides of the container section between one's finger and thumb.

For use, removed from package 10, squeezing the sides of package applicator 1 between the thumb and forefinger of each hand, as represented in FIG. 3, temporarily deforms the flexible walls and applies sufficient pressure on the confined ingredients to cause same to fracture inter-compartment divider seal 17, and permit the separate contents to mix. By squeezing or kneading the sides of the package further, the ingredients may be thoroughly mixed. Should a wall of the container section be transparent, one might include coloring material in the ingredients to provide a visual indication through the sides of the package of the completeness of the mixture.

Following such mixing, squeezing the package with greater force should force the confined ingredients to burst open chevron seal 19 to thereby open the outlet passage and permit the contents to be expressed from the package, such as partially represented in FIG. 4. Suitably, by squeezing the sides of the package between one's thumb and fingers to flex the package walls together reduces the size of the internal cavity and subjects the contents to a high enough pressure sufficient to cause the confined material 2 to burst or otherwise break dispenser seal 19, which thereby opens the container's dispensing outlet.

Assuming the viscosity of the ingredients is great enough, the dispensed ingredient causes the flaps 5 and 6 to pivot in opposite directions spreading them somewhat apart. Holding the container section 3 with ones fingers, the user may then press the ingredient against the desired surface, spreading the flaps further apart and applying the ingredient to the surface, such as represented in FIG. 5. As shown, the length of the flaps and their width is great enough to service this applicator function. The user may then move the spread flaps back and forth and/or up and down along the surface, spreading the dispensed ingredients about the surface.

The foregoing dual compartment container serves as a repository for individual ingredients that must be combined in order to activate them, a binary compound. One application that should come to mind immediately is epoxy resin, a strong adhesive. Typically that adhesive is sold in two containers, one containing the epoxy and the other containing the hardening agent, which must be dispensed and mixed together to form a useful adhesive. Homeowners who have used small amounts of epoxy adhesive in the past for their in-home projects recognize the advantage to the new container applicator combination. The mixing is accomplished in the package, avoiding the necessity of a mixing bowl and stirrer, and the portion is small, an individual sized dose, so there are no open containers to close. The epoxy is dispensed and smeared on the desired surface without likelihood of contact with the fingers; and there are no large quantities of left-over adhesive ingredients to store and which may possibly dry out until another project comes along.

As those skilled in the art appreciate, the invention may be produced using existing flexible packaging materials and assembly processes for the most part. It should be appreciated that the foregoing embodiment and the subsequent embodiments herein as well can be fabricated by hand, given the materials and a hand held heat bar, such as a hot iron. However, automated machine assembly is preferred for high volume manufacture.

Reference is made to FIGS. 6 through 9 which assist in the description of the container applicator of FIG. 1. Two webs of packaging film material 21 and 23 are dispensed in overlaying relationship by automatic machinery from a pair of rolls are cut to the desired shape as represented in FIG. 6. The two webs are then heat sealed to simultaneously form the outer thermal seal 15, the divider thermal seal 17 and the chevron exit thermal seal 19, as represented in FIG. 7, which is suitably accomplished using conventional heat sealing apparatus. The two webs are thereby transformed into the container section 3, formed between panels 16 and 18, that contains separate internal compartments 3A and 3B, and appended integral end flaps 5 and 6, the latter flap not being visible in this figure. Where a fold line 13 is to be included between the container section and flaps, that is also accomplished with the heat sealing machinery by pressing a straight bar into the material to form a permanent groove.

In the next step of the fabrication process, as illustrated in FIG. 8, one flap 5 is flipped over, exposing the inside surface of both flaps 5 and 6. The absorbent pads 7 and 8 are adhesively affixed to the respective flaps, suitably with thermosetting adhesive. Then flap 5 is flipped or rotated back to its normal position as in FIG. 9.

Alternatively, at the step represented in FIG. 8 a single larger absorbent pad 7' may be substituted for pads 7 and 8 that is large enough to cover substantially the inner surface of both flaps and contains a central aperture 9. positioned to align with the container's dispensing outlet at chevron 19. Such a unitary pad would be adhesively fastened to both flaps, bridging the space between those flaps, and would fold in half.

The two compartments are then filled with the component materials 2A and 2B, using a conventional needle filler. As is known, the filling of flat packages with condiments and other fluid ingredients is often accomplished with a hollow needle. The needle punctures a hole through the side of the packaging material and dispenses the fluid through the needle into the formed internal cavity. Upon withdrawing the needle, the filling machinery seals up the small puncture by heat sealing. That machinery is well known in the packaging art and need not be described further.

Figure 10:
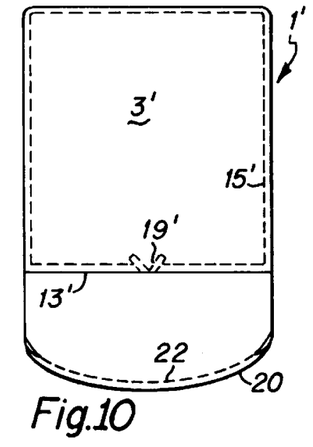
FIG. 10 illustrates another embodiment of the invention.

Reference is made to FIG. 10 which illustrates a second embodiment of the invention. For convenience, the same number used to identify elements of the prior embodiment is used for like elements appearing in this embodiment, but with those numbers primed. In this, package 1' contains only a single compartment 3'. Like the embodiment of FIG. 1, the unit is formed of two substantially identical sheets of plasticized metal foil laminate superimposed over one another and joined together by thermal seams. Applied by standard thermo seal technique, thermal seam 15', extends about the compartment section 3', interrupted in that path by a thermal seal, chevron seal 19', a frangible closure or seal, as variously termed, located at a midpoint of one end of the unit. The chevron seal closes the opening in thermal seam 15' that serves as the dispensing outlet. Thermal seam 15' extends from the rear end of the unit and extends along the side for about eighty per cent of the length of the unit and then turns in direction, leaving the remaining end portion of the foil laminate's length unsealed and free to flap.

The unit contains a fold line 13' formed in the sheet material, and a like fold line on the other sheet, not visible in this view. The fold lines assist the flaps to more easily swung around. However, as in the prior embodiment, in alternative embodiments of the invention the fold line may be omitted if desired. Generally speaking, where the material selected is sufficiently pliant, it is possible to pivot or arcuately spread apart the flaps over a wide arc without the inclusion and assistance of a fold line. Where, however, the material selected for the combination is thicker and, hence, of greater stiffness, then inclusion of a fold line is desirable.

To demonstrate the versatility of the invention, the foregoing embodiment does not include the absorbent pads used in the embodiment of FIG. 1, such as absorbent pads 7 and 8 in that prior figure. However, if the unit is to store a low viscosity ingredient, such as alcohol, or a polishing fluid, as examples, then incorporation of absorbent pads is preferable.

Figures 11, 12, 13:
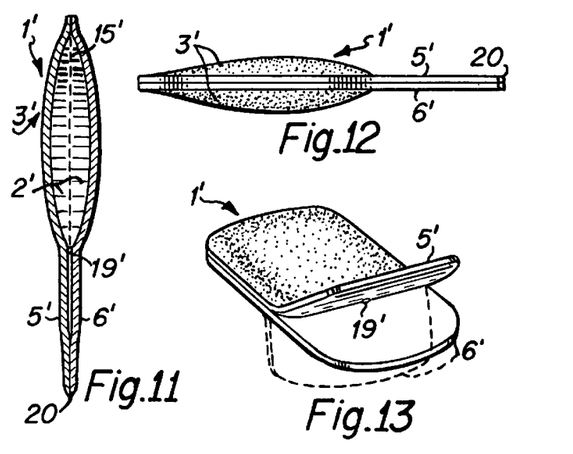
FIG. 11 is a section view of the embodiment of FIG. 10.
FIG. 12 illustrates the embodiment of FIG. 10 in side view.
FIG. 13 is a partial perspective view of the embodiment of FIG. 10 ready for operation.

The outer end of the two flaps in this embodiment, flap 5' and the underlying flap 6' visible in FIG. 11, are held together by a tear seal strip 20. The tear strip retains the flaps in place, essentially extending straight and in parallel, for more convenient packaging of such units, as filled with product, in multiple quantities in a box. The strip is formed integrally in the sheet material at the end of the flaps, by adhesively or thermally joining a narrow edge portion of the flap ends together and incorporating a familiar tear line 22 in the end of the flaps. The user simply tears off strip 20 to disconnect the flaps from one another, which permits the flaps to pivot about their respective fold lines independently of one another.

FIG. 11 illustrates the embodiment of FIG. 10 in section view. Flaps 5' and 6' extend essentially in parallel, but are connected together at the distal end by tear off tab 20. The proximal end of each flap is integral with the end of container section 3'. Thermal seam 15', that extends about the periphery of the container section connecting together the edges of the front and back panels and defines the container's internal cavity, is partially visible in the figure. The container section is illustrated as filled with an ingredient 2'.

As illustrated in side view in FIG. 12, the sides of the container section 3' bulge outwardly, since the unit is illustrated as filled with a dispensable ingredient. With the tear off tab 20 removed, flaps 5' and 6' can be manually spread apart as illustrated in partial perspective in FIG. 13. The frangible chevron seal 19', which closes the passage into the container, is indicated as being centrally positioned. As indicated by the dash line, flap 6' may pivot downwardly even further, should the packaging material used have a greater degree of pliancy or flexibility.

As in the prior embodiment, chevron seal 19' may be fractured by pressing the sides of the package together, to burst the seal and express the ingredients through the open outlet. Alternatively, with a slight change in positioning of the chevron seal, the chevron outlet seal may be broken, torn apart, when the flaps are manually spread apart. By having chevron 19' extend a small amount into the region occupied by the flaps, a front portion of the chevron is then thermally formed between the two flaps. As that chevron seal is relatively weak, intentionally made frangible, when the flaps are pulled apart, that pulling force detaches that portion of the seal, thereby opening the outlet. As earlier noted, although the flaps are pulled apart, the package remains intact since it is not reasonably possible to tear the package apart by using excess pull on the flaps due to the strength of the thermal seams.

At first glance the foregoing alternative appears superficially similar to the "tear apart" package used for packaging adhesive bandages, such as those marketed by the Johnson & Johnson Company. As one recalls, such a bandage package is formed between two strips of a generally moisture resistant or impervious paper composition that are joined together in overlying relationship to form a bandage compartment and two flaps, the flaps extending from an end and serving as "pull apart" tabs to the package. By pulling the tabs apart, the two strips are separated, tearing the package apart, to readily allow full access to the adhesive bandage. Other than to note some similarities allowed by hindsight, from the preceding description one easily recognizes that the present invention differs in structure, purpose and function.

The foregoing embodiment of FIGS. 10 through 13 is preferably fabricated using the same techniques illustrated and described in connection with FIGS. 6 through 9, excepting that the step of attaching the absorbent pads, represented in FIG. 8 is by-passed; and the steps of forming the tear strip 20 are included in the step represented by FIG. 7. When opened it is used in the same manner as described for the prior embodiment.

Although the container outlet passage and the chevron seal 19' to the container are centrally positioned in these and the subsequent embodiments, those skilled in the art appreciate that those elements may alternatively be positioned at other less preferred locations along the container's end, without departing from the scope of the present invention. The illustrated positioning ensures that there is less likelihood that the dispensed ingredient will in small part fall off a side edge of the flap.

Further, it is appreciated that the axis of the outlet passage in the foregoing and in the succeeding embodiments is preferably straight and coaxial with the principal axis of the container. In that way when the ingredients are expressed under pressure from the container, the ingredient flow should predominantly be toward the front of the unit. However, as those skilled in the art appreciate, the passage axis may be oriented in other directions in alternate embodiments without departing from the scope of the invention, as example, should one prefer the ingredient flow to be toward one side or other of the flap.

Figures 14, 15:
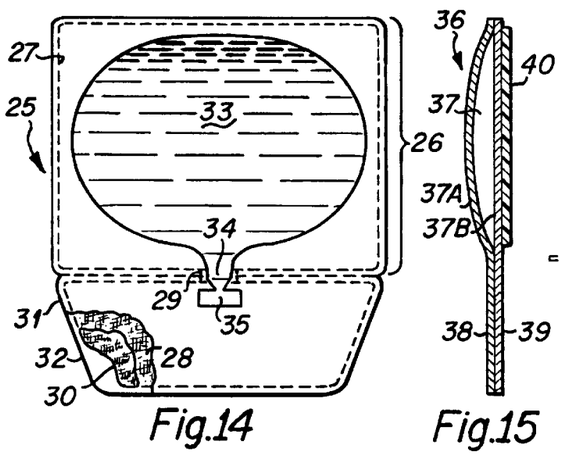
FIG. 14 illustrates still another embodiment of the invention in which the dispensable ingredient is confined in a shallow sack.
FIG. 15 is a section view of an alternative embodiment which incorporates a wall stiffening element.

Reference is next made to FIG. 14, which illustrates still another embodiment of the invention. Like the single compartment embodiment of FIG. 10, the container applicator 25 is formed of two substantially identical sheets of plasticized metal foil laminate superimposed over one another and joined together by thermal seams. Applied by standard thermo seal technique, thermal seam 27, extends about the compartment section 26 of the unit, interrupted in that path by a small outlet or passage 29, located at a midpoint of one end of the unit. Thermal seam 27 extends from the rear end of the unit and extends along side for about eighty per cent of the length of the unit, leaving the remaining end portion unsealed and free to flap, defining, as in the case of the prior embodiments, an upper flap 31, and a lower flap 32, only partially visible in this figure in the cut-out section to the lower left, underlying flap 31.

Each flap includes an absorbent pad 28 and 30, respectively, the latter pad being partially illustrated in the partial cut-out section to the lower left. That pads are attached to the inside surface of the flaps, as in the embodiment of FIG. 1, so that the pads face one another. Alternatively, it is appreciated that a single larger pad containing a central aperture, such as was described in connection with a prior embodiment, may be substituted for the two pads.

A relatively shallow sac or bladder or bag 33, as variously termed, is located within compartment section 26's internal region defined between the two foil laminate sheets. Bag 33 is formed in the same manner as the other portion of the unit, that is, by heat sealing the peripheral edge together to form a closed compartment. Further, the bag is filled with the intended ingredient prior to heat sealing the outer sheets together. Bag 33 contains a small neck 34, which serves as the bag's outlet. The neck extends through passage 29 and protrudes into the region of the confronting flaps 31. The neck is closed at the end by a frangible seal, particularly a tear tab 35.

In this embodiment, although the two sheets of flexible foil material are fused together to define an internal compartment, that compartment need not be liquid tight. The internal compartment subsumes another container, which is liquid tight. The "double sack" arrangement of this embodiment is intended for ingredients, such as auto polish.

For use, the user spreads the confronting flaps aside and accesses and removes the tear tab 34, opening the sack 33. Then, pressing the sides of the container with the fingers (as in FIG. 4), the liquid polish is expressed from the sack 33 onto the pads 28 and 30, spreading the respective associated flaps 31 and 32 apart. The user then grips the sides of the container and applies the polish to the auto surface, as earlier represented in FIG. 5, and spreads the polish about the surface with the spread out pads. In this way a small repair to the automobile finish can be quickly cleaned up and the dispenser applicator discarded.

The foregoing construction is more expensive to produce than the embodiments of FIGS. 1 and 3, and thus is preferred for applications that require the particular construction. As example, the lowest cost approach is to use the existing flexible foil laminate materials currently used in micro-sized packages. However, should one find that a particular spreadable ingredient adversely reacts with that material, rather than discarding use of the packaging material, one may find it more economical to house the material in a separate bag that is of a non-reactive material, which the described embodiment permits.

Upon reading the foregoing description of the preferred embodiments of the invention those skilled in the art should call to mind additional embodiments which are less preferred because they are of a more expensive construction or do not have all of the advantages and features of the foregoing embodiments, all of which come within the scope of the present invention.

As example, some may desire to have a more rigid applicator handle than the foregoing construction provides. To satisfy such an application, the foregoing structure may be modified to incorporate a more stiff characteristic on at least one side. Reference is made to FIG. 15 which shows in section an alternative embodiment containing a more firm handle applicator. As shown, the container applicator 36 contains a container section defining an internal cavity 37 formed between the two sheets 37A and 37B of flexible foil material thermo-sealed together with thermal seams and containing a chevron outlet seal, just as in the embodiment of FIG. 10, earlier described. It contains the two parallel extending applicator flaps 38 and 39 at one end. As in the case of the prior embodiments the container section includes the container outlet and the frangible chevron seal closure for that outlet, too small in size to be visible in the figure, and leads to the region between the spreadable flaps 38 and 39.

In this section view, for purposes of illustration, the one sheet to the left is shown bulging outwardly, as would be the situation in which the container is filled with a spreadable ingredient. However, the reader is reminded that the left sheet would be laying against the other sheet, prior to filling the internal cavity 37 with the packaged ingredient. In top view the embodiment should appear the same as the embodiment of FIG. 10.

A relatively thick layer or panel 40 is bonded to the right wall 37B. The panel may comprise a thick layer of thermoplastic material, perhaps two to five times greater in thickness than wall 37B. The panel is bonded to that wall thermally or with an adhesive.

In this embodiment, the frangible closure member is broken, as in most of the described embodiments, by pressing the sides of the container section between ones thumb and finger. However, in this construction, only the one wall 37A would flex, the stiffened wall serving somewhat as an anvil. The stored spreadable ingredient would then be expressed from the container section into the region between the spreadable flaps by continued finger pressing the side walls. The latter action is recognized as similar to that action described in the Campbell patent referenced in the Background to the invention.

It should be appreciated that the foregoing construction provides a better handle for the applicator, but, because of the extra steps and material for manufacture is more expensive to produce. Accordingly, such a structure is preferred only for particularly applications that require a more rigid applicator handle.

Figure 16:
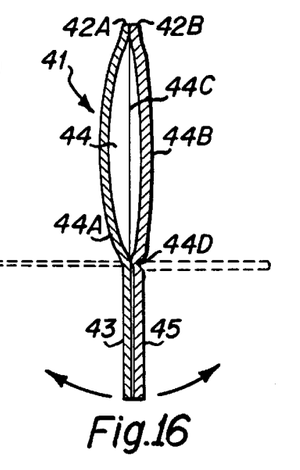
FIG. 16 is a section view of another embodiment whose walls and flaps are formed of materials of different thickness and stiffness.

In addition to the panel stiffener, the handle can be constructed to be more stiff in a more economical way. Reference is made to FIG. 16, which shows in section another alternative embodiment containing a more firm applicator handle. As shown, the container applicator 41 contains a container section defining an internal cavity 44 formed between the two sheets 44A and 44B of flexible foil material thermo-sealed together with thermal seams and containing a chevron outlet seal, just as in the embodiment of FIG. 10, earlier described. And it contains the two parallel extending applicator flaps 43 and 45 at one end. As in the case of the prior embodiments the container section includes the container outlet and the frangible chevron seal closure for that outlet, too small in size to be visible in the figure, and leads to the region between the spreadable flaps 43 and 45. The portion of the thermal seam 44c extending alongside the left side of the container section is visible in this view.

In this section view, again for purposes of illustration, the one foil sheet to the left 44A is shown bulging outwardly, as would be the situation in which the container is filled with a spreadable ingredient. However, the reader is again reminded that the left sheet 44A would be laying against the other sheet 44B, prior to filling the internal cavity 44 with the packaged ingredient. And in top view this embodiment should appear the same as the embodiment of FIG. 10.

As illustrated the one wall to the right 44B and the flap 45 are formed from a foil sheet laminate that is of greater thickness, suitably, three to five times as thick, and, hence, is more stiff in physical characteristic than the foil sheet laminate to the left. The increased wall thickness to the one side of the container section is thus less pliable or flexible than the other side, and, in that respect, essentially emulates the stiffening panel 40 of the prior embodiment.

As a consequence of the foregoing construction, flap 45 is substantially more thick than flap 43. A fold line 44D is included to assist in pivotal movement of flap 45, such as to a position indicated by the phantom lines to the right. Due to the greater thickness, it is more difficult to pivot the flap 45 without the fold line, whereas a fold line might not be required for flap 43. Although the flaps are not identical in thickness, that should not hinder the operation of the applicator.

In this embodiment, the frangible closure member is broken, as in the prior embodiments, by pressing the sides of the container section between ones thumb and finger. However, in this construction, the one wall 44A would flex to a greater extent than wall 44B, the stiffened wall serving somewhat as an anvil. The stored spreadable ingredient would then be expressed from the container section and into the region between flaps 43 and 45 by continued finger pressing the side walls. The latter action is recognized as similar to that action described in the Campbell patent referenced in the Background to the invention.

It should be appreciated that the foregoing construction also provides a better handle for the applicator, but although less expensive to produce than the embodiment of FIG. 16, still requires additional material due to the increased thickness of the material to one of the two sheets, and therefore is more expensive to manufacture than the embodiments of FIGS. 1–10. Accordingly, such a structure is also preferred only for particularly applications that require a more rigid applicator handle.

The foregoing embodiments are recognized as being rectangular in surface geometry, both wide and narrow in alternative versions and with flap geometries that were either rectangular with rounded corners or almost semicircular in geometry. As those skilled in the art appreciate, the invention may be fabricated in other geometries without departing from the scope of the present invention. As example, additional geometries for the described combination are pictorially illustrated in FIGS. 17 through 18. As shown in FIG. 17 in container applicator 46 both the container 47 and the wings 48, 49 may be semicircular in top surface geometry with the combination appearing as a circle. In the container applicator combination 50 FIG. 18 the container portion 51 and wings 52, 53 are of a quasi-diamond shape, the wings containing a rounded exterior point. The variety of permissible shapes offers the marketing person to adopt embodiments of the invention to a variety of marketing promotions for the packaged product.

Figure 19:
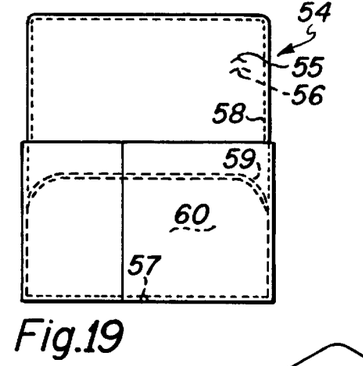
FIG. 19 is a pictorial view of the top of still another embodiment of the invention.

Reference is next made to FIG. 19, which pictorially illustrates still another embodiment of the invention 54. As in the prior embodiments the package is formed between two panels containing flexible thermoplastic material, 55 and 56, which, except for an outlet 57, are thermosealed together in overlying relationship along the outer edges by a thermal seam, as represented by the dotted line 58, to form an internal package compartment, with a pair of forwardly extending applicator flaps 59 and 60, each of which is formed integral with a respective one of panels 55 and 56. In this applicator package, a small void 57 in the thermal seam at the dispensing end of the package is centrally located in that wall between the flaps and serves as the outlet for the packaged ingredients. Unique to this embodiment, flaps 59 and 60, represented in invisible lines, are folded over one another and pressed onto the top of one of the package panels 55, thereby blocking outlet 57.

Just as in the prior embodiments, the inner surfaces of the flaps 59 and 60 may contain an absorbent pad, as desired, or remain bare. However, to simplify this description, the absorbent pads are not illustrated in this embodiment.

An adhesively coated tape 61 is wrapped about the dispensing end of the package, extending laterally across the width, and secures flaps 59 and 60 against panel 55. The tape is of a length, relative to the width of the package, so as to permit one end of the tape, located on tape flap 63, to overlap the other end, located on tape flap 62, when fixed in place. The tape's width is slightly greater than the length of applicator flaps 59 and 60 to permit a side end of the tape to attach directly to a portion of the underlying panel 55 as well as to the surface of the underlying applicator flap 60.

The tape adhesive is such as to provide an adequate protective seal to protect dispensing outlet 57 and, together with the folded over flaps 59 and 60, ensure the outlet remains closed; yet provides an adhesive strength or bond that is sufficiently weak to enable a normal user to easily peel away the tape to release the confined ingredients from the package. Adhesives of that kind are used in the familiar "Post-It®" notes.

Figure 20:
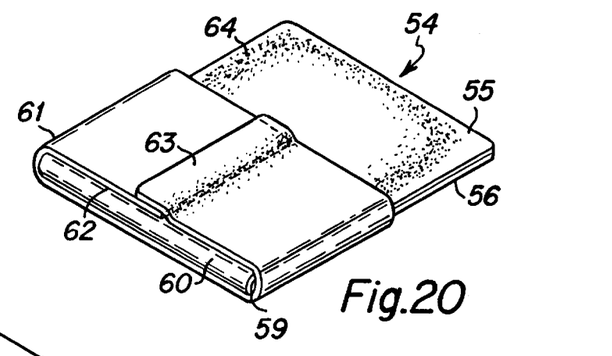
FIG. 20 illustrates the embodiment of FIG. 19 in perspective view.

As shown in the perspective view of FIG. 20, an end edge of the overlying end 63 of tape 61 may be left free of adhesive so that it uplifts slightly to offer the user a surface to easily grip the tape and pull it free of the package. As illustrated in this perspective view the package is shown to bulge slightly at 64, to accomodate the ingredient represented as being confined in the package. If desired the tape may be constructed even wider than that illustrated to also cover even the exposed fold at the attached end of flap 60 shown in the figure, creating an overhang in the tape at that end, and those overhanging edge portions of the tape may be sealed to one another.

Figures 21, 22:
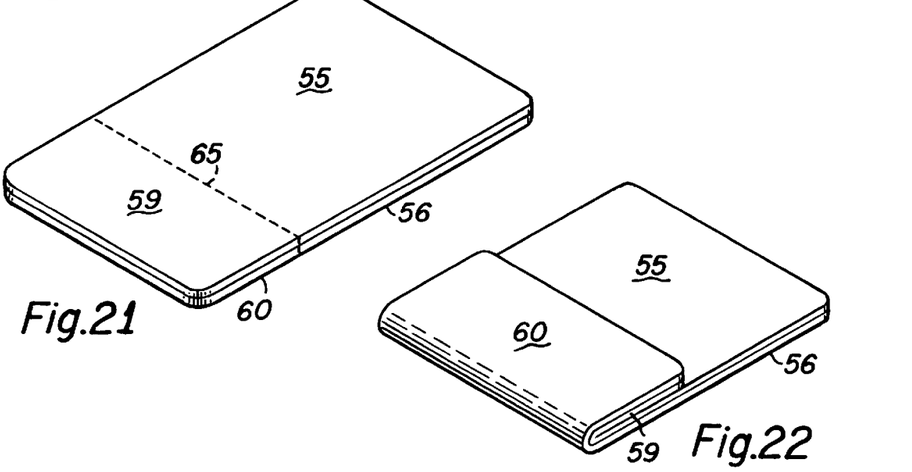
FIGS. 21, 22 and 23 are perspective illustrations of the embodiment of FIG. 19 in various stages of assembly.

The foregoing embodiment is easily manufactured. FIG. 21, shows the applicator package in the stage of assembly with two panels 55 and 56 attached in overlying relationship and the forwardly extended integral applicator flaps 59 and 60, attained through the procedure earlier described in connection with FIGS. 6–9 for a preceding embodiment. The left and right sides are attached along their edges with the thermal seam, the panels front edges are similarly thermally attached along the base of flaps 59 and 60, excepting the small gap therein forming outlet 57, earlier described and not visible in the figure, the fold lines 65, if included, are formed at the base of the flaps, and absorbent pads, if included, are installed on the inner confronting faces of the flaps. At this stage the rear edges of panels 55 and 56 remain unsealed to permit the confined ingredients to be inserted at a later stage of manufacture, as was the situation with the preceding embodiments.

Figure 23:
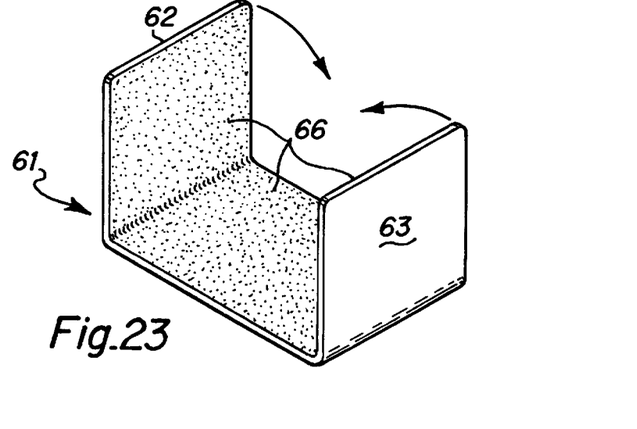

Next, as illustrated in FIG. 22, both flaps 59 and 60 are folded over on top of one of the two panels. The fold in the panel covers or blocks outlet 57. Then tape 61, the inner surface of which is coated with adhesive 66, is folded to form two vertically oriented flaps 62 and 63, as represented in FIG. 23. With the one edge of the tape aligned with the forward edge of the formed package shown in the figure, the horizontal portion of tape 61 is then pressed against the surface the lower panel 56. Tape flap 62 is then folded over onto the outer surface of the lower applicator flap 60 and to a portion of the surface of the upper package panel 55 to all of which the tape flap adheres. The other tape flap 63 is in turn folded over onto another portion of the outer surface of the lower flap 60, to another portion of the surface of the upper package panel 55, and over a portion of tape flap 62 to all of which the tape flap adheres. This effectively seals the dispensing end of the applicator package.

A dose of the fluid ingredient that is to be packaged in the applicator package, is squirted into the yet unsealed bottom end. The bottom end is then thermally sealed, and completes the filled applicator package earlier illustrated in FIG. 20 to which reference is again made.

When the user wishes to dispense and spread the ingredient from this applicator package embodiment, the user pulls up on tape flap 63 and pulls the entire tape away from the other elements. The pull on the tape also assists to pull at least the lower flap 60 away from its position atop the upper flap 59 and, ideally, due to friction, both flaps move to the forward extended and spread position. Alternatively, the user can move both flaps to a forward and spread position with the user's fingers. The dispensing outlet is thereby uncovered and is open.

At this juncture, the embodiment functions much like the preceding embodiments. By pressing the sides of the package with ones fingers, the user expresses a portion of the ingredients from the package onto the desired flaps or surface. With the flaps spread apart, the ingredient may be easily spread about the surface.

Although the foregoing may be accomplished manually as described, preferably fabrication and filling is accomplished by automated packaging machinery easily adapted to that purpose.

The foregoing embodiments of my invention use the same metal foil laminates, typically aluminum foil, found in existing flexible packages. Those skilled in the packaging art recognize the available metal foil laminates, including, by trade identification, Seal-foil 101, which is a metallized polyester or EVA; Seal-foil 102 which is a metalized polyester/polyester gold laminate; Seal-foil 122 is white kraft/metal foil/polyester laminate; Seal-foil 125ms is a brown/kraft/metal foil/polyester laminate; and Seal-foil 360 is a Nylon/poly/metal foil/poly in successive layers Kraft, metal foil, poly, polypropylene, clear, poly, and meal foil. Preferably a practical form of the foregoing embodiments is constructed from the Seal-foil 360 film laminate.

It is appreciated that the packaging structure is intended to package any number of different ingredients. The foil laminate used for the construction must be one that does not adversely react with the stored ingredient. Nor should the packaged ingredient be able to eat through or corrode the packaging material. As example, where food condiments are to be packaged, the package material is one that is industry tested and approved for food condiments.

The surface area defined by the top and bottom sides of the container section of the package applicator combination at a minimum should be of a size that accommodates at least one average thumb size of persons, as that information may be tabulated by the medical authorities, and perhaps be as large as that thumb size as would be expected to be the largest person one would expect to encounter in society. Thus, package applicator embodiments including flaps are anticipated to be between ½ by 1 inch to 6 by 6 inches or larger in size.

The size of the container's outlet may be varied depending upon the viscosity of the confined spreadable material and the amount of finger pressure desired to express the ingredient. For a given finger pressure with high viscosity fluids, such as molasses or honey, the closure passage can be quite large; for low viscosity fluids, such as alcohol, the passage can be minute.

It is understood that spreadable materials are liquids and semi-fluids in any viscosity, high or low, sols and gels and/or pastes. As example they include face creams and topicals, bug repellants, shoe cream, various food seasonings, such as oil, butter and toppings, such as mustard, catsup; sun tan oils and sun blockers, foot creams, paints, paint cleaners and paint stains, eye glass cleaner, hair coloring, hair removal, cosmetics and perfumes, aloe-vera gels, carpet cleaners and dyes, leather conditioners, automobile bug & road tar removers, waxes, scratch removers and tire dressings, automobile brake grease, oven cleaners and other cleaners, and adhesives. With the absorbent pads included in the combination, the container applicators can also include glass cleaners, water repellents, alcohols and antibacterial liquids. They can form an alcohol prep pad.

In the foregoing embodiments the sides of the container applicators are illustrated as transparent or plain in appearance. However, the practical embodiments of the invention are expected to contain advertising material, brand identification and other printed information and coloring as presently exists for micro-packages.

The invention offers additional benefit with the flaps serving a protective function. Those who've dispensed condiments, such as mustard, from flexible packages often find that as the mustard is being forced out the slit exit, not all of it drops onto the sandwich meat. Instead some portion of the mustard curls over backward and onto the side of the package where the misdirected mustard often comes into contact with the user's thumb. The user must then clean his hand. With the present invention, the back curling mustard is blocked from reaching the user's thumb by the spreading wings or flaps.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A container and applicator combination, comprising:
   a container, said container having top and bottom surfaces and first and second ends;
   said top and bottom surfaces having a length and width dimension defining a surface area sufficient in size to receive at least the thumb of a hand, whereby said container may be gripped between the thumb and finger of a hand; and
   said length and width dimension being substantially greater than the thickness dimension between said top and bottom surfaces to define a relatively thin appearance;
   said container including a dispensing outlet located at said second end; and
   an applicator, said applicator being integrally attached to said container to define therewith a unitary one-piece structure;
   said applicator comprising:
      first and second wings, each of said wings being integrally attached to and extending outwardly from said second end of said container and being capable of being spread apart pivotally in opposite directions over a wide arc;
      said first wing being located to one side of said dispensing outlet and said second wing being located to an opposite side of said dispensing outlet; and
      said first wing defining an applicator surface on an underside surface thereof and said second wing defining an applicator surface on an upperside surface thereof.

2. The invention as defined in claim 1, wherein said top surface of said container and said first wing comprise first and second laterally spaced portions, respectively, of a first flexible foil sheet; and wherein said bottom surface of said container and said second wing comprise first and second laterally displaced portions of a second flexible foil sheet.

3. The invention as defined in claim 2, wherein said first portion of said first sheet and said-first portion of said second sheet are fused together to define a shallow cavity between said first and second flexible foil sheets.

4. The invention as defined in claim 3, further including frangible seal means located between said shallow cavity and said second portion of each of said first and second flexible foil sheets.

5. The invention as defined in claim 2, wherein
   said first wing is normally disposed in a stored position essentially oriented in parallel with the axis of said dispensing outlet and is pivotable by at least ninety degrees in one direction of rotation relative to said dispensing outlet axis;

and said second wing is normally disposed in a stored position essentially oriented in parallel with the axis of said dispensing outlet and is pivotable by at least ninety degrees in a second direction of rotation relative to said dispensing outlet axis, said second direction being opposite to said first direction, whereby said applicator surfaces may be spread apart and oriented in a direction off of said dispensing outlet axis and said container may be gripped between the thumb and finger of at least one hand to move said applicator surfaces along a surface.

6. The invention as defined in claim 2, further including a fold line located in said first flexible foil sheet between said first wing and said container to enhance pivotal movement of said first wing; and a second fold line located in said second flexible foil sheet between said second wing and said container to enhance pivotal movement of said second wing.

7. The invention as defined in claim 1, further including frangible closure means for normally maintaining said outlet closed and opening said outlet responsive to a predetermined pressure exerted from within said container for opening said outlet passage.

8. The invention as defined in claim 1, further including frangible closure means for normally maintaining said outlet closed and opening said outlet, responsive to force exerted by pulling said wings in opposite directions.

9. The invention as defined in claim 1, further including a fold line located between said first wing and said container to enhance pivotal movement of said first wing; and a second fold line located between said second wing and said container to enhance pivotal movement of said second wing.

10. The invention as defined in claim 1, further comprising a first pad attached to said underside surface of said first wing and a second pad attached to said upperside surface of said second wing.

11. The invention as defined in claim 1, further comprising a pad attached to said underside surface of said first and second wings, said pad including a small passage there through adjacent said dispensing outlet.

12. A package and applicator combination for a spreadable substance comprising:
 a pair of flexible sheets, said flexible sheets being connected together to define therebetween a cavity region for confining a spreadable substance and an applicator;
 said applicator comprising a pair of end flaps, one of said flaps integrally formed in an end of one of said flexible sheets in said pair and the other of said flaps being integrally formed in the corresponding end of the other one of said flexible sheets in said pair, and said flaps being positioned in overlying relationship; and
 a frangible closure integrally formed between said pair of sheets, said closure being normally closed and providing, when open, a passage from said cavity region to said flaps through which said spreadable substance may be expressed into at least the region between said flaps, whereby sufficient finger pressure exerted to press said flexible sheets toward one another increases pressure on said confined spreadable substance sufficient to express said spreadable substance from said cavity region through said passage and into contact with said flaps.

13. The invention as defined in claim 12 wherein said pair of flexible sheets are joined together by a thermal seam, said thermal seam circumscribing a predetermined area of said sheets to define a boundary to all of said cavity region and defining an opening to said cavity region, said opening being closed by said frangible closure.

14. The invention as defined in claim 13, wherein said frangible closure comprises a second thermal seam, said second thermal seam adjoining said first thermal seam and closing said opening in said boundary, said second thermal seam further comprising a chevron shape.

15. The invention as defined in claim 13, further comprising a second thermal seam dividing said cavity into first and second compartments for separately storing component ingredients of said spreadable substance, said thermal seam joining said flexible sheets defining a first thermal seam being stronger than said second thermal seam, whereby said second thermal seam is fractured by exerting a first level of pressure against said flexible sheets, less than the pressure required to fracture said frangible closure, to allow said separate components to be mixed together to form said spreadable material, prior to dispensing thereof.

16. The invention as defined in claim 15, further comprising: a pair of absorbent pads, one associated with each of said flaps of said pair of flaps; a first one of said pair of absorbent pads being attached to an inner side surface of one of said flaps and the second one of said pair of absorbent pads being attached to an inner side surface of the other one of said flaps to place said pads in confronting relationship.

17. The invention as defined in claim 12, wherein said cavity region comprises first and second compartments.

18. The invention as defined in claim 12, further comprising: a pair of absorbent pads, one associated with each of said flaps of said pair of flaps; a first one of said pair of absorbent pads being attached to an inner side surface of one of said flaps and the second one of said pair of absorbent pads being attached to an inner side surface of the other one of said flaps to place said pads in confronting relationship.

19. The invention as defined in claim 12, further comprising: an absorbent pad; said absorbent pad being attached to an inner side surface of each of said flaps and bridging the space there between; said absorbent pad including a small central opening.

20. The invention as defined in claim 12, further comprising:
 a closed pouch for packaging said pair of flexible sheets, said pouch ensleeving said flexible sheets; said closed pouch including a tear-off tab for opening said pouch and exposing said pair of flexible sheets.

21. The invention as defined in claim 12, wherein each of said flexible sheets includes a fold line at the proximal end of the associated flap to permit said first flap to pivot outwardly in a first direction and said second flap to pivot outwardly in the opposite direction to provide a wide applicator surface.

22. The invention as defined in claim 12, wherein each of said flaps of said pair includes on an inner side surface thereof an absorbent pad.

23. The invention as defined in claim 12 wherein said frangible closure breaks open in response to a predetermined level of pressure exerted by said confined substance against said frangible closure.

24. The invention as defined in claim 12 wherein said frangible closure opens in response to pulling of said flaps in opposite directions.

25. An integral package and applicator combination comprising:
 a relatively flat container having a pair of walls, at least one of said walls of said pair being resilient and said walls being of an area sufficient to permit said container to be gripped and squeezed between the thumb and fingers of one hand; said flat container including an outlet, said outlet being located at an end of said relatively flat container;
 first and second flaps; said flaps being of a width less than the width of said end of said relatively flat container and said flaps being integrally attached to said end of said container;

said first flap being attached to said container at a position above said outlet for swinging movement in one direction and a second one of said flaps being attached to said container at a position below said outlet, in confronting relationship to said first flap, for swinging movement in a second direction opposite to said first direction, whereby said flaps may spread apart to define an applicator and wherein said flat container serves as a handle to said applicator.

26. The invention as defined in claim 25, wherein said flat container further includes:

a relatively flat bladder received within said pair of walls for confining material to be dispensed, said bladder including a neck, and said neck extending through said outlet a predetermined distance;

said neck further comprises a tear of tab for opening said bladder, said tear-off tab being accessible from said end of said passage by manually spreading said flaps apart.

27. The invention as defined in claim 26, wherein each of said flaps of said pair includes on an inner side surface thereof an absorbent pad.

28. The invention as defined in claim 27, wherein each of said walls include a fold line at the end of said flap integrally connected to the respective wall for defining a pivot line for said flap.

29. The invention as defined in claim 26, wherein said bladder comprises a flexible foil material.

30. The invention as defined in claim 25, further comprising an absorbent pad; said absorbent pad being secured to the inner surface of each of said flaps whereby said absorbent pad bridges said flaps; and said absorbent pad further including a small passage there through adjacent said outlet.

31. The invention as defined in claim 30, wherein each of said walls include a fold line at the end of said flap integrally connected to the respective wall for defining a pivot line for said flap wherein each of said walls and said flaps comprise a flexible foil material.

32. The invention as defined in claim 25, wherein each of said walls and said flaps comprise a flexible foil material.

33. The invention as defined in claim 25, further including frangible closure means for normally closing said outlet, said frangible closure means being responsive to a predetermined pressure exerted from within said container for opening said outlet passage.

34. The invention as defined in claim 33, further including a fold line located between said first flap and said container to enhance pivotal movement of said first flap; and a second fold line located between said second flap and said container.

35. The invention as defined in claim 33, further comprising a first pad attached to an underside surface of said first flap and a second pad attached to an upperside surface of said second flap.

36. The invention as defined in claim 35, wherein each of said walls and said flaps comprise a flexible foil material.

37. The invention as defined in claim 35, wherein one of said walls of said container and said first flap comprise, respectively, first and second laterally spaced portions of a first sheet of flexible foil material and wherein a second wall of said pair of walls comprise, respectively, first and second laterally spaced portions of a second sheet of flexible foil material; said first sheet of flexible foil material being superimposed over said second sheet of flexible foil material with said first and second portions of said first sheet being aligned with said first and second portions of said second sheet; said first portion of said first and second sheets being fused together to define a shallow cavity between said first and second sheets.

38. The invention as defined in claim 25, wherein one of said walls of said container and said first flap comprise, respectively, first and second laterally spaced portions of a first sheet of flexible foil material and wherein a second wall of said pair of walls comprise, respectively, first and second laterally spaced portions of a second sheet of flexible foil material; said first sheet of flexible foil material being superimposed over said second sheet of flexible foil material with said first and second portions of said first sheet being aligned with said first and second portions of said second sheet; said first portion of said first and second sheets being fused together to define a shallow cavity between said first and second sheets.

39. The invention as defined in claim 38, wherein said first and second flaps are folded over one another and over one of said walls in said pair of walls and extend in a direction away from said end of said container and cover said outlet and a portion of said one wall; and, further comprising: removable adhesive tape for securing said folded over flaps to said one of said walls.

40. The invention as defined in claim 39, wherein said removable adhesive tape comprises an elongated rectangular strip of predetermined length and width, said predetermined width being greater than the length of either of said flaps and a length greater than twice the width of said walls, and wherein said tape traverses the width of said walls and covers said flaps and an uncovered portion of said walls.

41. The invention as defined in claim 39, further comprising: a pair of absorbent pads, one associated with each of said first and second flaps; a first one of said pair of absorbent pads being attached to an inner side surface of said first flap and a second one of said pair of absorbent pads being attached to an inner side surface of said second flap to place said absorbent pads in confronting relationship.

42. The invention as defined in claim 39, further comprising: an absorbent pad; said absorbent pad being attached to an inner side surface of each of said first and second flaps and bridging a space there between; said absorbent pad including a small central opening.

43. The invention as defined in claim 25 wherein one of said walls of said pair of walls comprises a flexible characteristic and wherein the other of said pair of walls comprises a relatively stiff characteristic.

44. The invention as defined in claim 25 wherein said flaps comprise a flexible characteristic.

45. The invention as defined in claim 44 wherein said flaps further comprise a stiff characteristic.

46. The invention as defined in claim 25, wherein said first and second flaps are folded over one another and over one of said walls in said pair of walls and extend in a direction away from said end of said container and cover said outlet and a portion of said one wall; and, further comprising: removable adhesive tape for securing said folded over flaps to said one of said walls.

47. The invention as defined in claim 46, wherein said removable adhesive tape comprises an elongated rectangular strip of predetermined length and width, said predetermined width being greater than the length of either of said flaps and a length greater than twice the width of said walls, and wherein said tape traverses the width of said walls and covers said flaps and an uncovered portion of said walls.

48. A package and applicator combination comprising:

a pair of flexible foil sheets of substantially identical structure superimposed over one another and permanently fastened together to define there between an internal region for confining a spreadable substance and an outlet to said internal region from which to express said spreadable substance; and an applicator, said applicator comprising a pair of arcuately spreadable wings for spreading said spreadable substance over a surface.

* * * * *